(12) United States Patent
Kim et al.

(10) Patent No.: US 11,190,044 B2
(45) Date of Patent: Nov. 30, 2021

(54) CHARGING CONTROL METHOD AND CHARGING CONTROL SYSTEM USING ENERGY GENERATED FROM SOLAR ROOF

(71) Applicants: HYUNDAI MOTOR COMPANY, Seoul (KR); KIA MOTORS CORPORATION, Seoul (KR)

(72) Inventors: Tae-Hyuck Kim, Seoul (KR); Hae-Yoon Jung, Yongin-si (KR); Hyun-Soo Park, Seoul (KR); Jun-Yeon Park, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 133 days.

(21) Appl. No.: 16/689,640

(22) Filed: Nov. 20, 2019

(65) Prior Publication Data
US 2020/0343761 A1    Oct. 29, 2020

(30) Foreign Application Priority Data
Apr. 25, 2019   (KR) .................. 10-2019-0048559

(51) Int. Cl.
*H02J 7/35* (2006.01)
*H02J 7/00* (2006.01)
(Continued)

(52) U.S. Cl.
CPC ............... *H02J 7/35* (2013.01); *B60L 8/003* (2013.01); *B60L 50/66* (2019.02); *B60L 53/22* (2019.02);
(Continued)

(58) Field of Classification Search
CPC ........... H02J 7/35; H02J 7/007; H02J 7/0068; B60L 58/12; B60L 53/22; B60L 50/66; B60L 8/003
(Continued)

(56) References Cited

U.S. PATENT DOCUMENTS

| 3,350,618 A | * | 10/1967 | Zanteson | ............... | H02J 7/0029 320/102 |
| 8,145,327 B2 | * | 3/2012 | Banks et al. | ........... | H02M 7/003 700/19 |

(Continued)

FOREIGN PATENT DOCUMENTS

| KR | 10-0182664 | 12/1998 |
| KR | 10-0182665 | 12/1998 |

(Continued)

*Primary Examiner* — Sun J Lin
(74) *Attorney, Agent, or Firm* — Lempia Summerfield Katz LLC

(57) ABSTRACT

One form of a charging control method using energy generated from a solar roof embedded with a solar cell according to the disclosure includes: transmitting an amount of energy generated from the solar roof by respective control units of a system for charging control; calculating an electrical load; determining whether the amount of energy generated from the solar roof is larger than the electrical load; instructing an output of a high-voltage converter when the amount of energy generated from the solar roof is larger than the electrical load; determining whether a high-voltage battery is in a charging state; and performing a variable voltage control when a high voltage is outputted in accordance with the instruction to perform the output of the high-voltage converter; and performing a charging control on the high-voltage battery in consideration of the amount of energy generated from the solar roof when it is determined that the high-voltage battery is in the charging state. It is possible to improve fuel economy and marketability of a (Continued)

vehicle by optimally controlling charging of a high-voltage battery and a low-voltage battery by using energy supplied from the solar roof while the vehicle travels.

16 Claims, 3 Drawing Sheets

(51) Int. Cl.
*B60L 8/00* (2006.01)
*B60L 53/22* (2019.01)
*B60L 50/60* (2019.01)
*B60L 58/12* (2019.01)

(52) U.S. Cl.
CPC .............. *B60L 58/12* (2019.02); *H02J 7/007* (2013.01); *H02J 7/0068* (2013.01)

(58) Field of Classification Search
USPC ........................................................ 320/101
See application file for complete search history.

(56) References Cited

U.S. PATENT DOCUMENTS

| 8,519,566 | B2 * | 8/2013 | Recker et al. ........ H02J 7/0068 |
| | | | 307/64 |
| 10,541,544 | B2 * | 1/2020 | Paek et al. ............ H02J 7/0029 |
| 2012/0020060 | A1 * | 1/2012 | Myer et al. ............. F21S 8/085 |
| | | | 362/183 |
| 2016/0126385 | A1 | 5/2016 | Kim et al. |

FOREIGN PATENT DOCUMENTS

| KR | 10-2013-0034996 | 4/2013 |
| KR | 10-2014-0082006 | 7/2014 |
| KR | 20-2016-0001839 | 5/2016 |
| KR | 10-1743855 | 5/2017 |
| KR | 10-2017-0141585 | 12/2017 |

* cited by examiner

CHARGING CONTROL METHOD AND CHARGING CONTROL SYSTEM USING ENERGY GENERATED FROM SOLAR ROOF

CROSS-REFERENCE TO RELATED APPLICATION

This application claims priority to and the benefit of Korean Patent Application No. 10-2019-0048559, filed on Apr. 25, 2019, the entire contents of which is incorporated herein by reference.

FIELD

The present disclosure relates to a charging control method and a charging control system using energy generated from a solar roof, and particularly, to a charging control method and a charging control system that perform charging control on a low-voltage battery and a high-voltage battery by using energy generated from a solar roof by means of cooperative control of respective units of the charging control system while a vehicle travels.

BACKGROUND

The statements in this section merely provide background information related to the present disclosure and may not constitute prior art.

Recently, with the focus on environmentally-friendly energy sources, developments are being actively performed on a silicon solar cell panel (i.e., solar roof) which is installed on an upper surface of a vehicle body to generate electric power when a temperature of an interior of a vehicle is increased while parked outdoors, such that the generated electric power is used as auxiliary electric power for operating an air-conditioning device or charging a battery.

In this regard, recently, there is a rapidly increasing demand for environmentally-friendly vehicles in the automobile industry. A charging control device for charging a high-voltage battery is required for an electric vehicle (EV) and a plug-in hybrid electric vehicle (PHEV) which are environmentally-friendly vehicles.

However, in the case of technologies proposed in the related art, a battery is charged with energy generated from a solar roof while a vehicle is parked, but while the vehicle travels, a supply of electric power to a high-voltage battery (main battery) using energy generated from a solar roof is prohibited, and only a low-voltage battery (auxiliary battery) may be charged. As described above, in the related art, there is a problem in that the main battery cannot be charged with energy generated from the solar roof while the vehicle travels.

Therefore, it is necessary to perform charging control on a low-voltage battery and a high-voltage battery using energy generated from a solar roof by means of cooperative control of respective units of a charging control system even while a vehicle travels.

SUMMARY

The present disclosure has been made in an effort to perform charging control on a low-voltage battery and a high-voltage battery by using energy generated from a solar roof by means of cooperative control of respective units of a charging control system while a vehicle travels.

One form of the present disclosure provides a charging control method using energy generated from a solar roof embedded with a solar cell, the charging control method including: transmitting an amount of energy generated from a solar roof by respective control units of a system for charging control; calculating an electrical load; determining whether the amount of energy generated from the solar roof is larger than the electrical load; instructing an output of a high-voltage converter when the amount of energy generated from the solar roof is larger than the electrical load; determining whether a high-voltage battery is in a charging state and performing variable voltage control when a high voltage is outputted in accordance with the instruction to perform the output of the high-voltage converter; and performing charging control on the high-voltage battery in consideration of the amount of energy generated from the solar roof when it is determined that the high-voltage battery is in the charging state.

The charging control method may further include: instructing an output of a low-voltage converter when the amount of energy generated from the solar roof is smaller than the electrical load; determining whether the low-voltage battery is in the charging state when a low voltage is outputted in accordance with the instruction to perform the output of the low-voltage converter; and performing charging control on the low-voltage battery in consideration of the amount of energy generated from the solar roof when it is determined that the low-voltage battery is in the charging state.

The charging control method may further include: performing discharging control on the high-voltage battery in consideration of the amount of energy generated from the solar roof when it is determined that the high-voltage battery is in a discharging state.

The charging control method may further include: performing discharging control on the low-voltage battery in consideration of the amount of energy generated from the solar roof when it is determined that the low-voltage battery is in the discharging state.

Whether to instruct the converter to perform a voltage output may be determined in accordance with an operating state of a vehicle.

The charging control method may be performed with an autonomous low-voltage battery charging strategy when it is determined that the high-voltage battery and the low-voltage battery cannot be charged by using the solar roof.

Whether the high-voltage battery or the low-voltage battery is in the charging state may be determined based on a state-of-charge of the battery, estimation of energy, input/output electric currents of the battery, and voltage sensing.

Another form of the present disclosure provides a charging control system using energy generated from a solar roof embedded with a solar cell, the charging control system including: a first control unit which transmits the amount of energy generated from a solar roof; a second control unit which receives the amount of energy generated from the solar roof, calculates an electrical load, determines whether the amount of energy generated from the solar roof is larger than the electrical load, and instructs the first control unit to perform an output of a high-voltage converter when the amount of energy generated from the solar roof is larger than the electrical load; and a third control unit which determines whether the high-voltage battery is in a charging state when a high voltage is outputted from the first control unit, and performs charging control on the high-voltage battery in consideration of the amount of energy generated from the solar roof when it is determined that the high-voltage battery is in the charging state, wherein the second control unit performs variable voltage control when a high voltage is outputted from the first control unit.

In the charging control system, the second control unit may instruct the first control unit to perform an output of a low-voltage converter and perform variable voltage control in consideration of the amount of energy generated from the solar roof when the amount of energy generated from the solar roof is smaller than the electrical load, the third control unit may determine whether the low-voltage battery is in the charging state when a low voltage is outputted from the first control unit, and the third control unit may perform charging control on the low-voltage battery in consideration of the amount of energy generated from the solar roof when it is determined that the low-voltage battery is in the charging state.

In the charging control system, the third control unit may perform discharging control on the high-voltage battery in consideration of the amount of energy generated from the solar roof when it is determined that the high-voltage battery is in a discharging state.

In the charging control system, the third control unit may perform discharging control on the low-voltage battery in consideration of the amount of energy generated from the solar roof when it is determined that the low-voltage battery is in the discharging state.

The first control unit may control a solar DC-DC converter (SDC) which converts electric power energy generated from the solar roof into electric power and includes the high-voltage converter and the low-voltage converter.

The second control unit may control an electric power converting device which DC-converts electric power energy outputted from the high-voltage battery to the low-voltage battery.

The second control unit may determine whether to instruct the first control unit to perform a voltage output on the converter in accordance with operating states of a vehicle.

The second control unit may operate with an autonomous low-voltage battery charging strategy when the first control unit determines that the high-voltage battery and the low-voltage battery cannot be charged using the solar roof.

The third control unit may determine whether the battery is in the charging state based on a state-of-charge of the battery, an estimation of energy, input/output electric currents of the battery, and a voltage sensing.

According to the present disclosure having the above-mentioned configurations, it is possible to improve fuel economy and marketability of a vehicle by optimally controlling charging of a high-voltage battery and a low-voltage battery by using energy supplied from the solar roof while the vehicle travels.

The vehicle applied with the solar roof according to the present disclosure is very advantageous for acquiring CO2 credits as compared with vehicles having other components such as solar glass, LED lamps, ventilation seats, ISG, and the like and capable of coping with environmental regulation fines by obtaining CO2 credits.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
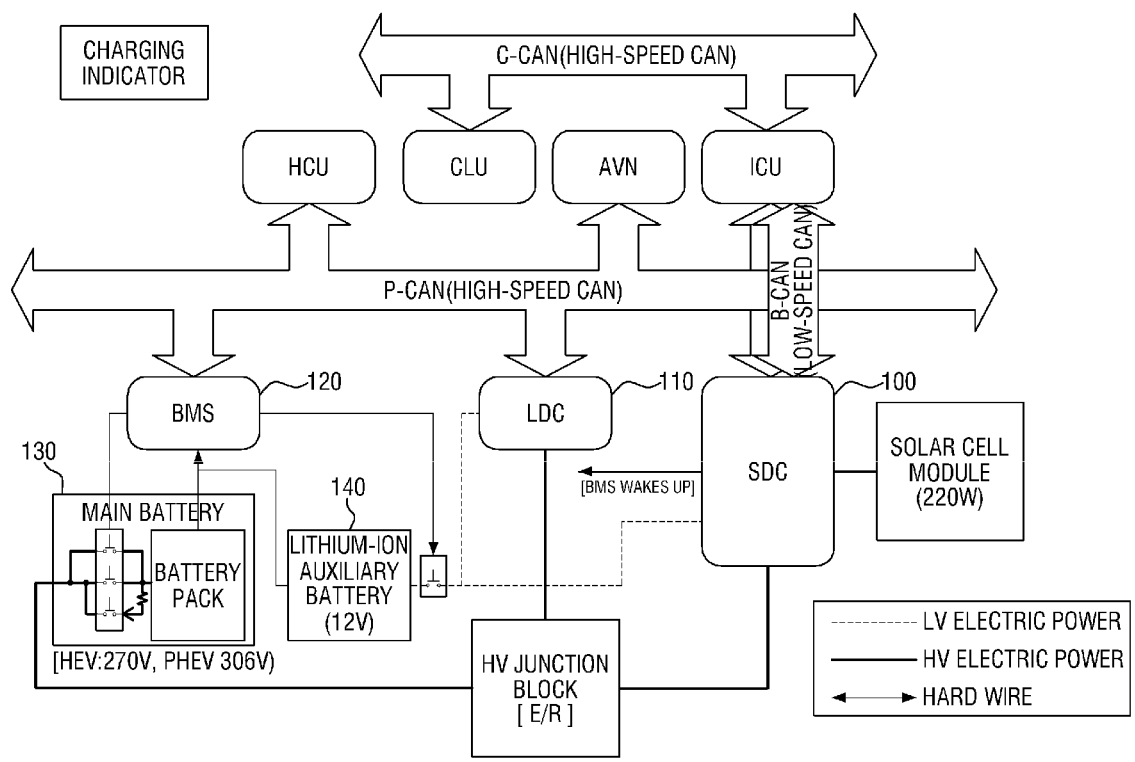
FIG. 1 is a schematic view illustrating one form of an entire configuration of a charging control system using a solar roof.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, the present disclosure will be described in detail with reference to the accompanying drawings. However, the present disclosure is not restricted or limited by exemplary embodiments. Like reference numerals indicated in the respective drawings refer to members which perform substantially the same functions.

An object and an effect of the present disclosure may be naturally understood or may become clearer from the following description, and the object and the effect of the present disclosure are not restricted only by the following description. In addition, in the description of the present disclosure, the specific descriptions of publicly known technologies related with the present disclosure will be omitted when it is determined that the specific descriptions may unnecessarily obscure the subject matter of the present disclosure.

FIG. 1 is a schematic view illustrating one form of an entire configuration of a charging control system using a solar roof. That is, FIG. 1 is a system schematic view illustrating cooperative control between respective control units for charging a high-voltage and a low-voltage battery of an environmentally-friendly electric vehicle such as an HEV or a PHEV by using photovoltaic power generation.

As illustrated in FIG. 1, a solar DC-DC converter (SDC) 100 charges a high-voltage battery (main battery) 130 and a low-voltage battery (auxiliary battery) 140 by using a high-voltage converter and a low-voltage converter, which constitute the SDC 100, when energy generated from a solar cell module by sunlight is inputted. Therefore, it is possible to charge the high-voltage battery and the low-voltage battery with energy supplied from the solar cell module only when the vehicle is parked (IG Off) but also after an engine of the vehicle starts (IG On/HEV READY), and as a result, it is possible to reduce a loss of vehicle energy and increase a traveling distance.

The solar-roof charging control system illustrated in FIG. 1 performs cooperative control between the SDC 100, a low voltage DC-DC converter (LDC) 110, and a battery management system (BMS) 120, and the cooperative control is performed with another strategies in accordance with operating states of the vehicle, that is, a parking state (IG Off) of the vehicle, a state after the engine of the vehicle starts (IG On/HEV READY), a charging state (Charging) of the vehicle, and the like.

Details and functions of the respective control units of the charging control system illustrated in FIG. 1 are shown in the following Table 1.

TABLE 1

| Classification | Controllers | Functions |
|---|---|---|
| Charge | SDC | Controlling of solar cell output, Determining entry/release condition (Only when vehicle is parked (IG Off)) |
| | BMS | Cooperative control subject (Mode 1), Monitoring High-voltage/12 V battery, Controlling Main/12 V relay |
| | LDC | Cooperative control subject (Mode 2/3) |
| | HCU | Determining engine start (HEV READY) entry |
| Display | CLU/AVN | Displaying charging information (operating state, energy information, etc.) |
| | SDC | Controlling charging indicator (1 port, center fascia) |

As shown in Table 1, the SDC 100 charges the high-voltage battery and the low-voltage (12 V) battery with energy (220 W) generated by the solar cell module by using the high-voltage and low-voltage DC-DC converters. In this regard, referring to FIG. 1, the SDC 100 receives information through B-CAN (low-speed CAN) to determine an entry/release condition in the state in which the vehicle is parked (IG Off).

The SDC 100, which is a controller of the solar-roof charging control system illustrated in FIG. 1, includes two converters (the high-voltage converter and the low-voltage converter) and charges the battery of the vehicle by means of the converters when energy is generated by sunlight. According to some implementations of the present disclosure, the high-voltage converter and the low-voltage converter of the SDC 100 may be structured to be connected in parallel with each other. In addition, the LDC 110, which is a cooperative control subject, performs variable voltage control for charging the low-voltage battery by converting electric power of the high-voltage battery in accordance with a state-of-charge (SOC) of the high-voltage battery, a state-of-charge (SOC) of the low-voltage battery, an electrical load, an operating state of the vehicle, and the like. Further, the BMS 120, which is another cooperative control subject, performs optimum charging/discharging control on the high-voltage battery in accordance with the state-of-charge (SOC) of the high-voltage battery, a temperature, energy consumption for operating the motor, and regenerative braking energy.

Figure 2:
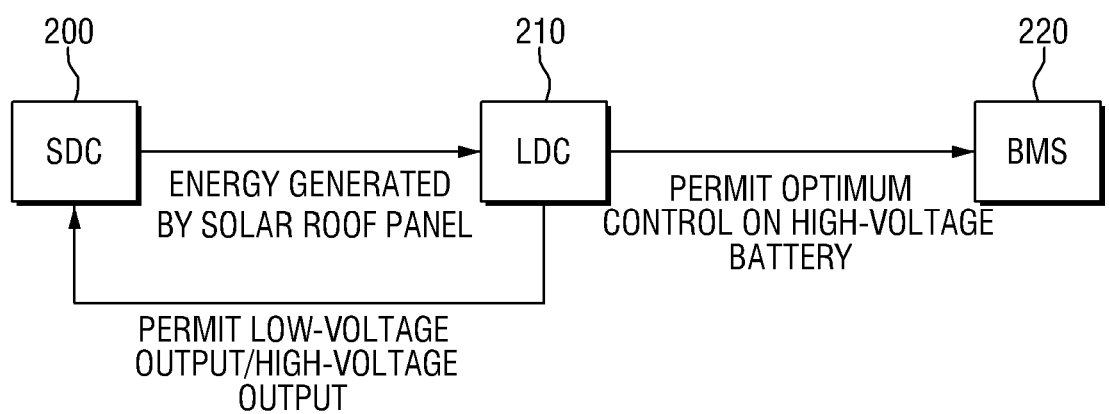
FIG. 2 is a schematic view illustrating an operation mechanism of each control unit of the charging control system using the solar roof.

FIG. 2 is a schematic view illustrating an operation mechanism of each control unit of the charging control system using the solar roof according to the exemplary embodiment of the present disclosure. An operation mechanism illustrated in FIG. 2 shows cooperative control operations between the respective control units, that is, the SDC 200, the LDC 210, and the BMS 220 that constitute the solar-roof charging control system.

As illustrated in FIG. 2, the SDC 200 transmits the amount of energy generated from the solar roof panel to the LDC 210. The LDC 210 compares the received amount of energy, that is, the solar-roof output energy with an electrical load, and instructs the SDC 200 to perform an output of the low-voltage converter when the solar-roof output energy is lower than the electrical load, thereby permitting a low-voltage output. When the solar-roof output energy is higher than the electrical load, the LDC 210 instructs the SDC 200 to perform an output of the high-voltage converter, thereby permitting a high-voltage output. In some implementations of the present disclosure, the process of instructing the SDC 200 to perform the output of the high-voltage converter or the output of the low-voltage converter may be performed by the LDC 210. In other implementations of the present disclosure, the process of instructing the SDC 200 to perform the output of the high-voltage converter or the output of the low-voltage converter may be performed by a separate high-level controller instead of the LDC 210.

In a case in which the SDC 200 outputs a high voltage, the BMS 220 performs charging or discharging control on the high-voltage battery, that is, performs optimum control on the high-voltage battery in consideration of solar-roof output energy in accordance with whether the high-voltage battery is in a charging state or a discharging state.

The operation mechanisms illustrated in FIG. 2 may be classified as shown in Table 2 in accordance with whether the solar roof is applied or whether energy is generated by the solar roof panel.

TABLE 2

| Vehicle classification | Generating solar roof energy | Controlling LDC variable voltage/current | Optimally controlling BMS high-voltage battery |
|---|---|---|---|
| Existing configuration | — | Controlling variable voltage in consideration of electrical load | Controlling SOC in consideration of charging/discharging |
| Solar roof applied | X | | |
| | ○ | Controlling variable voltage in consideration of solar roof energy | Controlling SOC in consideration of solar roof energy |

As shown in Table 2, in a case in which no solar roof is applied to the vehicle or a case in which no energy is generated by the solar roof panel, the LDC 210 performs variable voltage control in consideration of an electrical load, and the BMS 220 performs charging/discharging control on the high-voltage battery in consideration of states of charge/discharge of the high-voltage battery. In contrast, in a case in which solar roof energy is generated in the vehicle to which the solar roof is applied, the LDC 210 performs variable voltage control in consideration of energy generated from the solar roof, and the BMS 220 also performs charging/discharging control on the high-voltage battery in consideration of energy generated from the solar roof.

Figure 3:
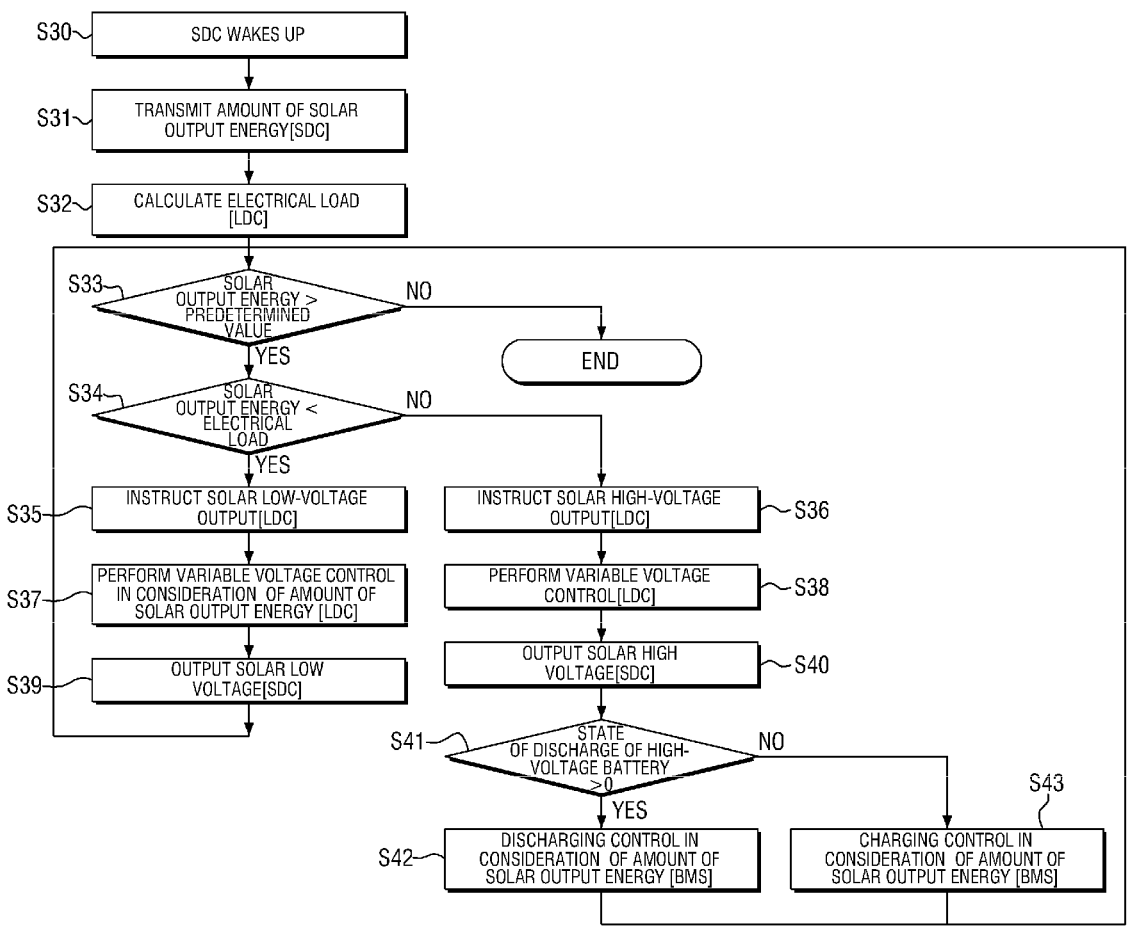
FIG. 3 is a flowchart illustrating one form of a charging control method using the solar roof.

FIG. 3 is a flowchart illustrating one form of a charging control method using the solar roof. FIG. 3 illustrates a flowchart which classifies, for each step, the cooperative control operations between the SDC 200, the LDC 210, and the BMS 220 illustrated in FIG. 2.

First, in step S30, the SDC wakes up when energy is generated from the solar cell module embedded in the solar roof. Thereafter, in step S31, the SDC transmits the amount of solar-roof output energy to the LDC.

The LDC calculates a current 12 V electrical load of the vehicle (S32), the LDC determines whether the amount of solar-roof output energy received from the SDC is larger than a predetermined value in step S33, and the process goes to step S34 when the amount of solar-roof output energy is larger than the predetermined value.

The LDC determines whether the amount of solar-roof output energy is smaller than an electrical load in step S34, and the process goes to step S35 when the LDC determines that the amount of solar-roof output energy is smaller than the electrical load, such that the LDC or the separate high-level controller instructs the SDC to perform the output of the low-voltage converter. Thereafter, the LDC performs variable voltage control in consideration of the amount of solar-roof output energy (S37), and the SDC outputs a low voltage (S39).

Meanwhile, in a case in which it is determined that the amount of solar-roof output energy is larger than the electrical load in step S34, the process goes to step S36, such that the LDC or the separate high-level controller instructs the SDC to perform the output of the high-voltage converter. Thereafter, the LDC performs variable voltage control in the related art (S38), and the SDC outputs a high voltage (S40).

In the case in which the high voltage is outputted from the SDC in step S40, the process goes to step S41, such that the BMS determines whether the state is a charging or discharging state, that is, whether a stage of discharge of the high-voltage battery is larger than 0 based on the current state-of-charge (SOC) of the high-voltage battery, estimation of energy, input/output electric currents of the high-voltage battery, voltage sensing, and the like. Thereafter, the BMS performs discharging control on the high-voltage battery in consideration of the amount of solar-roof output energy when it is determined that the high-voltage battery is in the discharging state (S42), and the BMS performs charging control on the high-voltage battery in consideration of the amount of solar-roof output energy when it is determined that the high-voltage battery is in the charging state (S43).

The process goes back to step S39, and the BMS performs charging or discharging control on the low-voltage battery in consideration of the amount of solar-roof output energy when the low voltage is outputted from the SDC (S42 and S43).

While the present disclosure has been described in detail above with reference to the representative exemplary embodiments and implementations, those skilled in the art to which the present disclosure pertains will understand that the exemplary embodiments and implementations may be variously modified without departing from the scope of the present disclosure. Accordingly, the scope of the present disclosure should not be limited to the described exemplary embodiments and implementations, but should be defined not only by the appended claims but also by all changes or modified forms induced from an equivalent concept to the claims.

What is claimed is:

1. A charging control method using energy generated from a solar roof embedded with a solar cell, the charging control method comprising:
   transmitting, by at least one controller of a system for charging control, an amount of energy generated from a solar roof;
   calculating an electrical load;
   determining whether the amount of energy generated from the solar roof is larger than the electrical load;
   instructing an output of a high-voltage converter when the amount of energy generated from the solar roof is larger than the electrical load;
   determining whether a high-voltage battery is in a charging state and performing a variable voltage control when a high voltage is outputted in accordance with the instruction to perform the output of the high-voltage converter; and
   performing a charging control on the high-voltage battery in consideration of the amount of energy generated from the solar roof when it is determined that the high-voltage battery is in the charging state.

2. The charging control method of claim 1, further comprising:
   instructing an output of a low-voltage converter when the amount of energy generated from the solar roof is smaller than the electrical load;
   determining whether the low-voltage battery is in the charging state when a low voltage is outputted in accordance with the instruction to perform the output of the low-voltage converter; and
   performing charging control on the low-voltage battery in consideration of the amount of energy generated from the solar roof when it is determined that the low-voltage battery is in the charging state.

3. The charging control method of claim 2, further comprising:
   performing discharging control on the low-voltage battery in consideration of the amount of energy generated from the solar roof when it is determined that the low-voltage battery is in a discharging state.

4. The charging control method of claim 1, further comprising:
   performing discharging control on the high-voltage battery in consideration of the amount of energy generated from the solar roof when it is determined that the high-voltage battery is in a discharging state.

5. The charging control method of claim 1, wherein whether to instruct a converter to perform a voltage output is determined in accordance with an operating state of a vehicle.

6. The charging control method of claim 1, which is performed with an autonomous low-voltage battery charging strategy when it is determined that the high-voltage battery and the low-voltage battery cannot be charged by using the solar roof.

7. The charging control method of claim 1, wherein whether a battery of either the high-voltage battery or the low-voltage battery is in the charging state is determined based on a state-of-charge of the battery, an estimation of energy, input/output electric currents of the battery, and a voltage sensing.

8. A charging control system using energy generated from a solar roof embedded with a solar cell, the charging control system comprising:
   a first controller configured to transmit an amount of energy generated from a solar roof;
   a second controller configured to:
     receive the amount of energy generated from the solar roof,
     calculate an electrical load,
     determine whether the amount of energy generated from the solar roof is larger than the electrical load, and
     instruct the first controller to perform an output of a high-voltage converter when the amount of energy generated from the solar roof is larger than the electrical load; and
   a third controller configured to:
     determine whether a high-voltage battery is in a charging state when a high voltage is outputted from the first controller, and
     perform a charging control on the high-voltage battery in consideration of the amount of energy generated from the solar roof when it is determined that the high-voltage battery is in the charging state,
   wherein the second controller is configured to perform a variable voltage control when a high voltage is outputted from the first controller.

9. The charging control system of claim 8, wherein:
   the second controller is configured to instruct the first controller to perform an output of a low-voltage converter and to perform a variable voltage control in consideration of the amount of energy generated from the solar roof when the amount of energy generated from the solar roof is smaller than the electrical load, and the third controller is configured to determine whether a low-voltage battery is in a charging state when a low voltage is outputted from the first controller, and the third controller is configured to determine a charging control on the low-voltage battery in consideration of the amount of energy generated from the solar roof when it is determined that the low-voltage battery is in the charging state.

10. The charging control system of claim 9, wherein the third controller is configured to perform a discharging control on the low-voltage battery in consideration of the amount of energy generated from the solar roof when it is determined that the low-voltage battery is in a discharging state.

11. The charging control system of claim 9, wherein the first controller is configured to control a solar DC-DC converter (SDC) which converts electric power energy generated from the solar roof into an electric power and includes the high-voltage converter and the low-voltage converter.

12. The charging control system of claim 9, wherein the second controller is configured to control an electric power converting device which DC-converts electric power energy outputted from the high-voltage battery to the low-voltage battery.

13. The charging control system of claim 9, wherein the second controller is configured to operate with an autonomous low-voltage battery charging strategy when the first control unit determines that the high-voltage battery and the low-voltage battery cannot be charged by using the solar roof.

14. The charging control system of claim 9, wherein the third controller is configured to determine whether a battery of either the high-voltage battery or the low-voltage battery is in the charging state based on a state-of-charge of the battery, an estimation of energy, input/output electric currents of the battery, and a voltage sensing.

15. The charging control system of claim 8, wherein the third controller is configured to perform a discharging control on the high-voltage battery in consideration of the amount of energy generated from the solar roof when it is determined that the high-voltage battery is in a discharging state.

16. The charging control system of claim 8, wherein the second controller is configured to determine whether to instruct the first controller to perform a voltage output on the high-voltage converter in accordance with operating states of a vehicle.

* * * * *